US012739900B2

(12) United States Patent
Li et al.

(10) Patent No.: US 12,739,900 B2

(45) Date of Patent: Sep. 15, 2026

(54) STATISTICAL DATA ACQUISITION METHOD, BASE STATION, NETWORK MANAGEMENT SYSTEM AND STORAGE MEDIUM

(71) Applicant: ZTE CORPORATION, Shenzhen (CN)

(72) Inventors: Jinglan Li, Shenzhen (CN); Penghua Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 319 days.

(21) Appl. No.: 18/713,017

(22) PCT Filed: Oct. 20, 2022

(86) PCT No.: PCT/CN2022/126484

§ 371 (c)(1), (2) Date: May 23, 2024

(87) PCT Pub. No.: WO2023/093392

PCT Pub. Date: Jun. 1, 2023

(65) Prior Publication Data

US 2025/0008578 A1 Jan. 2, 2025

(30) Foreign Application Priority Data

Nov. 24, 2021 (CN) ......................... 202111407398.7

(51) Int. Cl.

*H04W 76/10* (2018.01)
*H04W 24/02* (2009.01)

(Continued)

(52) U.S. Cl.

CPC ........... *H04W 76/10* (2018.02); *H04W 48/20* (2013.01); *H04W 88/085* (2013.01)

(58) Field of Classification Search

CPC ... H04W 76/10; H04W 48/20; H04W 88/085; H04W 24/02; H04W 24/04; H04W 76/27; H04W 24/08

(Continued)

(56) References Cited

U.S. PATENT DOCUMENTS

| | | | | |
|---|---|---|---|---|
| 2019/0327133 | A1 | 10/2019 | Gao et al. | |
| 2022/0159525 | A1* | 5/2022 | Chou | H04W 24/02 |
| 2025/0150402 | A1* | 5/2025 | Östberg | H04L 47/12 |

FOREIGN PATENT DOCUMENTS

| | | | |
|---|---|---|---|
| CN | 111031564 | A | 4/2020 |
| CN | 111757424 | A | 10/2020 |

(Continued)

OTHER PUBLICATIONS

NTT Docomo R3-171832 (âF1 interface: Further consideration on M-plane aspectsâ, â May 15 19, 2017) (Year: 2017).*

(Continued)

*Primary Examiner* — Xuan Lu

(74) *Attorney, Agent, or Firm* — Vivacqua Crane, PLLC

(57) ABSTRACT

Provided in the present disclosure are a statistical data acquisition method, a base station, a network management system and a storage medium. The statistical data acquisition method may include: when trigger information for an RRC connection has been received from a UE, determining a first statistical event corresponding to the trigger information; and reporting the first statistical event to a network management system, such that the network management system updates statistical data for a physical cell according to the first statistical event.

16 Claims, 11 Drawing Sheets

(51) Int. Cl.
*H04W 24/04* (2009.01)
*H04W 24/08* (2009.01)
*H04W 48/20* (2009.01)
*H04W 76/27* (2018.01)
*H04W 88/08* (2009.01)

(58) Field of Classification Search
USPC .......................................................... 370/329
See application file for complete search history.

(56) References Cited

FOREIGN PATENT DOCUMENTS

| | | | |
|---|---|---|---|
| CN | 113271629 | A | 8/2021 |
| WO | 2016082482 | A1 | 6/2016 |
| WO | 2021049871 | A1 | 3/2021 |
| WO | 2021144062 | A1 | 7/2021 |

OTHER PUBLICATIONS

International Searching Authority. International Search Report and Written Opinion for PCT Application No. PCT/CN2022/126484 and English translation, mailed Jan. 10, 2023, pp. 1-10.

3GPP Technical Specification Group Radio Access Network. "F1 interface: Further consideration on M-plane aspects," 3GPP TSG RAN WG3 Meeting #96, May 2017, pp. 1-5.

3GPP Technical Specification Group Radio Access Network. "Left open issues on F1 interface management," 3GPP TSG RAN WG3 NR Meeting #97, Aug. 2017, pp. 1-3.

3GPP Technical Specification Group Services and System. "5G end to end Key Performance Indicators (KPI)" 3GPP TS 28.554, v. 17.1.1, 2020, pp. 1-38.

European Patent Office. Extended European Search Report for EP Application No. 22897475.4, mailed Feb. 27, 2025, pp. 1-16.

* cited by examiner

FIG. 1

Figures 8, 9:
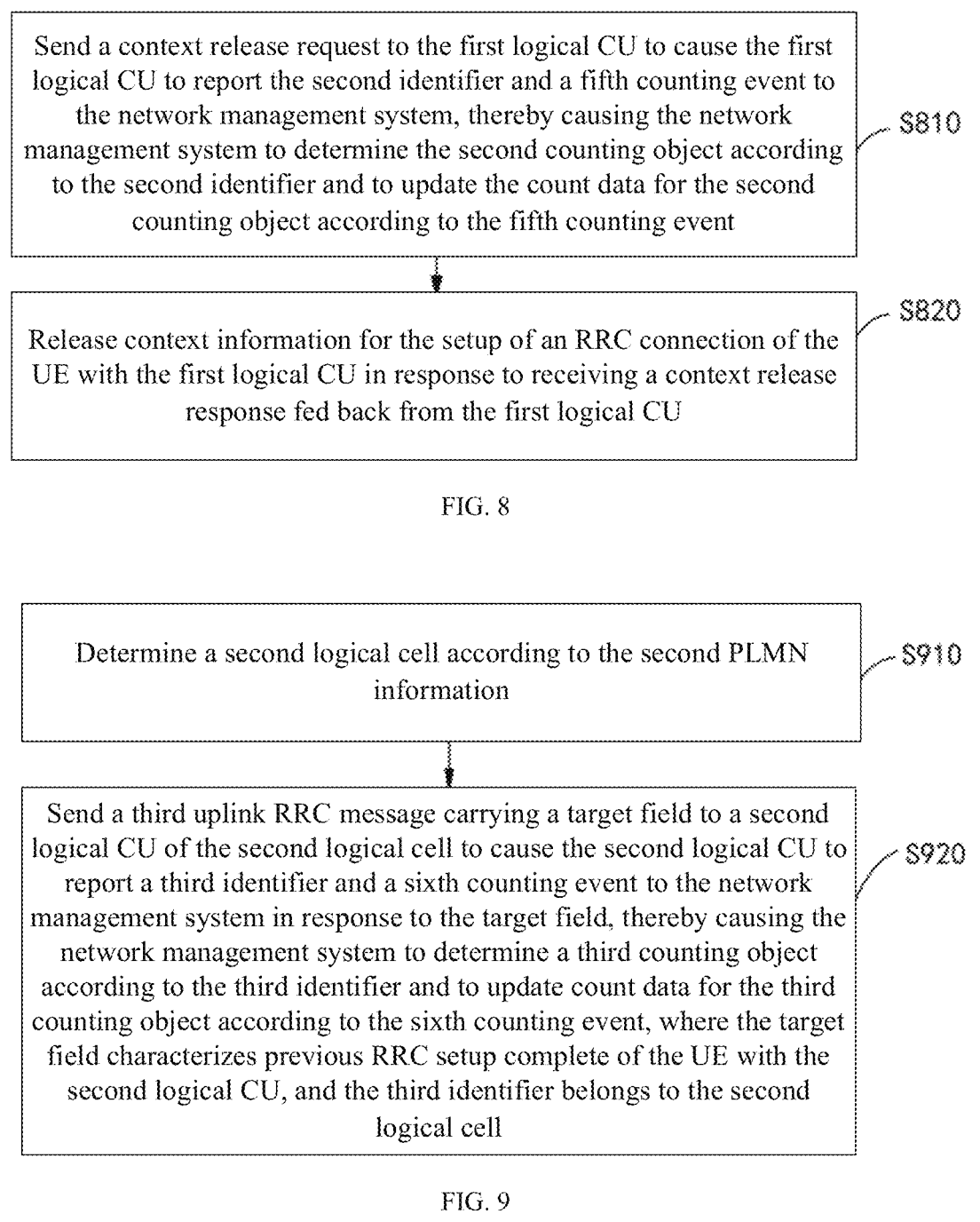

Send a context release request to the first logical CU to cause the first logical CU to report the second identifier and a fifth counting event to the network management system, thereby causing the network management system to determine the second counting object according to the second identifier and to update the count data for the second counting object according to the fifth counting event

S810

Release context information for the setup of an RRC connection of the UE with the first logical CU in response to receiving a context release response fed back from the first logical CU

Determine a second logical cell according to the second PLMN information

S910

Send a third uplink RRC message carrying a target field to a second logical CU of the second logical cell to cause the second logical CU to report a third identifier and a sixth counting event to the network management system in response to the target field, thereby causing the network management system to determine a third counting object according to the third identifier and to update count data for the third counting object according to the sixth counting event, where the target field characterizes previous RRC setup complete of the UE with the second logical CU, and the third identifier belongs to the second logical cell

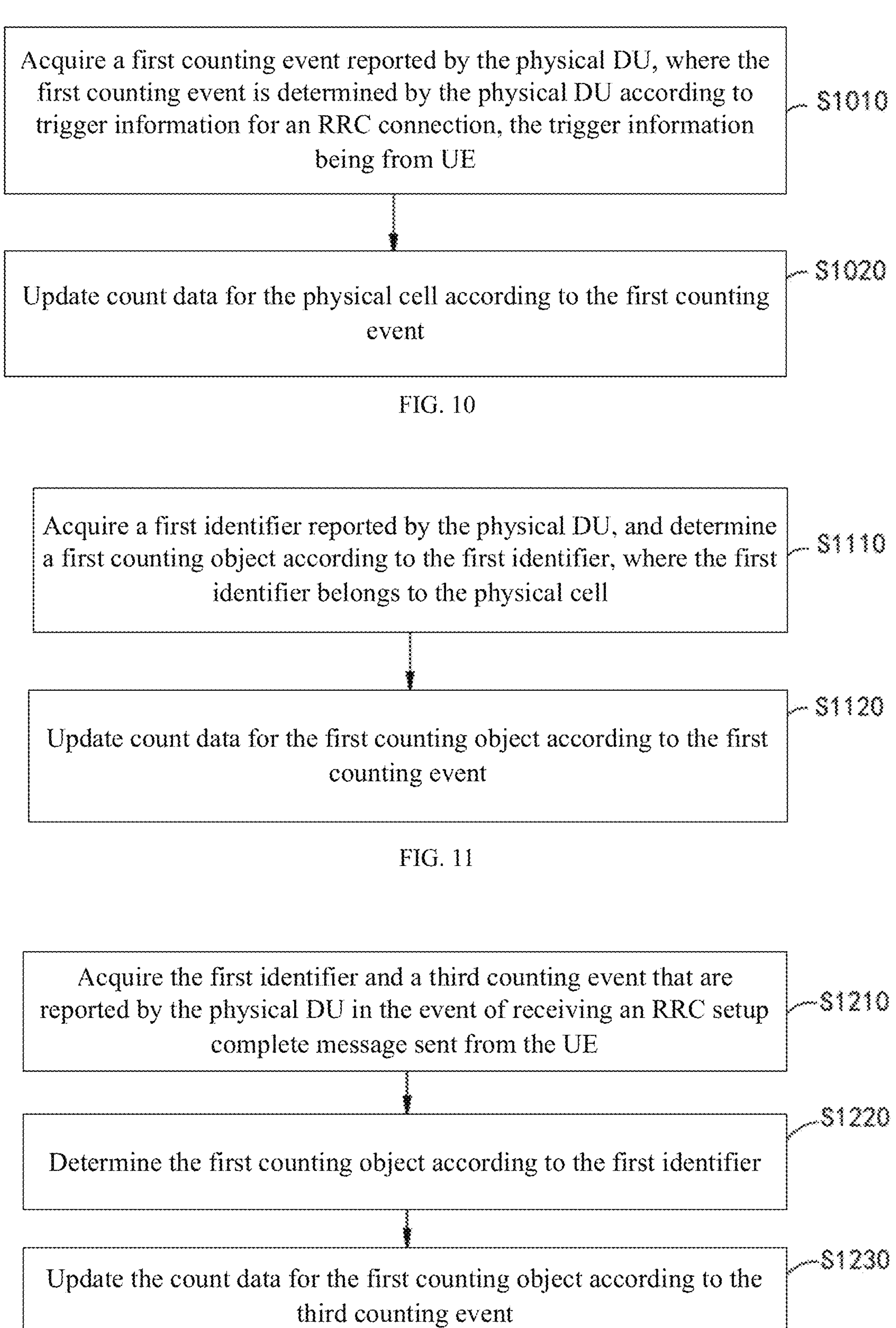
Acquire a first counting event reported by the physical DU, where the first counting event is determined by the physical DU according to trigger information for an RRC connection, the trigger information being from UE
S1010
Update count data for the physical cell according to the first counting event
S1020
FIG. 10
Acquire a first identifier reported by the physical DU, and determine a first counting object according to the first identifier, where the first identifier belongs to the physical cell
S1110
Update count data for the first counting object according to the first counting event
S1120
FIG. 11
Acquire the first identifier and a third counting event that are reported by the physical DU in the event of receiving an RRC setup complete message sent from the UE
S1210
Determine the first counting object according to the first identifier
S1220
Update the count data for the first counting object according to the third counting event
S1230
FIG. 12

STATISTICAL DATA ACQUISITION METHOD, BASE STATION, NETWORK MANAGEMENT SYSTEM AND STORAGE MEDIUM

CROSS-REFERENCE TO RELATED APPLICATION

This application is a national stage filing under 35 U.S.C. § 371 of international application number PCT/CN2022/126484, filed Oct. 20, 2022, which claims priority to Chinese patent application No. 202111407398.7, filed Nov. 24, 2021. The contents of these applications are incorporated herein by reference in their entirety.

TECHNICAL FIELD

The present disclosure relates to, but is not limited to, the field of mobile communications, and in particular to a method for acquiring count data, a base station, a network management system, and a storage medium.

BACKGROUND

In the air interface technology of the 5th generation (5G) communication technology, the base station is divided into a centralized unit (CU) and a distributed unit (DU), where the CU is used to implement non-real-time wireless high-level protocol stack functions and to handle cell and user equipment (UE) high-level related functions, and the DU is used to handle cell and UE physical layer functions as well as Layer 2 protocol stack functions that have high requirements for real-time performance. In a shared network scenario, different operators can not only share the resource of the physical cell, but also configure different identifiers for the physical cell, so that one physical cell corresponds to more than one logical cell or logical base station, and different logical base station CUs can be deployed on different physical devices.

Key performance indicator (KPI) of radio resource control (RRC) provide an important basis for cell operation and maintenance. According to the provisions of the existing protocols, the KPI counting of the RRC are completed in the CU during the access process of the UE. In a shared network scenario, a physical cell corresponds to logical base station CUs, and the KPIs counted in each logical base station CU can only reflect the RRC connection situation of the logical cell but cannot reflect the RRC connection situation of the physical cell, which is not conducive to the operation and maintenance of the physical cell.

SUMMARY

The following is a summary of the subject matters described in detail herein. This summary is not intended to limit the scope of protection of the claims.

Embodiments of the present disclosure provide a method for acquiring count data, a base station, a network management system, and a storage medium.

In accordance with a first aspect of the present disclosure, an embodiment provides a method for acquiring count data, applied to a physical DU of a physical cell, the physical DU being communicatively connected to a network management system, the method may include: determining, in response to receiving trigger information for an RRC connection from UE, a first counting event corresponding to the trigger information; and reporting the first counting event to the network management system to cause the network management system to update count data for the physical cell according to the first counting event.

In accordance with a second aspect of the present disclosure, an embodiment provides a method for acquiring count data, applied to a network management system, the network management system being communicatively connected to a physical DU of a physical cell, the method may include: acquiring a first counting event reported by the physical DU, where the first counting event is determined by the physical DU according to trigger information for an RRC connection, the trigger information being from UE; and updating count data for the physical cell according to the first counting event.

In accordance with a third aspect of the present disclosure, an embodiment provides a base station, including: a memory, a processor, and a computer program stored on the memory and runnable on the processor, where the processor, when executing the computer program, implements a method for acquiring count data of the first aspect.

In accordance with a fourth aspect of the present disclosure, an embodiment provides a network management system, including: a memory, a processor, and a computer program stored on the memory and runnable on the processor, where the processor, when executing the computer program, implements a method for acquiring count data of the second aspect.

In accordance with a fifth aspect of the present disclosure, an embodiment provides a computer-readable storage medium storing computer-executable instructions, the computer-executable instructions being used to implement a method for acquiring count data of the first aspect, or, alternatively, to implement a method for acquiring count data of the second aspect.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

FIG. 1 is a flowchart of a method for acquiring count data applied to a physical DU provided in an embodiment of the present disclosure;

FIG. 8 is a flowchart of the reporting of a fifth counting event by a first logical CU provided in another embodiment of the present disclosure;

FIG. 9 is a flowchart of the reporting of a sixth counting event by a second logical CU provided in another embodiment of the present disclosure;

FIG. 10 is a flowchart of a method for acquiring count data applied to a network management system provided in another embodiment of the present disclosure;

FIG. 11 is a flowchart of the reporting of a first counting event by a DU provided in another embodiment of the present disclosure;

FIG. 12 is a flowchart of the reporting of a third counting event by a DU provided in another embodiment of the present disclosure;

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a functional module division is shown in a schematic diagram of an apparatus and a logical order is shown in a flowchart, the steps shown or described may be executed, in some cases, with a different module division from that of the apparatus or in a different order from that in the flowchart. The terms such as "first" and "second" in the description, claims or above-mentioned drawings are intended to distinguish between similar objects and are not necessarily to describe a specific order or sequence.

The present disclosure provides a method for acquiring count data, a base station, a network management system, and a storage medium, the method for acquiring count data may include: acquiring a target VN group identifier in response to acquiring a PDU session setup request initiated by UE, the target VN group identifier belonging to a target VN group to which the UE belongs; determining at least one optional SMF according to the target VN group identifier; and determining a target SMF from the optional SMF according to a preset policy, and creating a PDU session belonging to the target VN group by interaction with the target SMF. According to the technical scheme of this embodiment, it is possible to determine at least one optional SMF through the target VN group identifier, and then select a target SMF according to the preset policy, thus realizing flexible selection of an SMF through the AMF, which effectively improves the flexibility of networking and is conducive to realizing flexible configuration and flexible networking.

Figure 2:
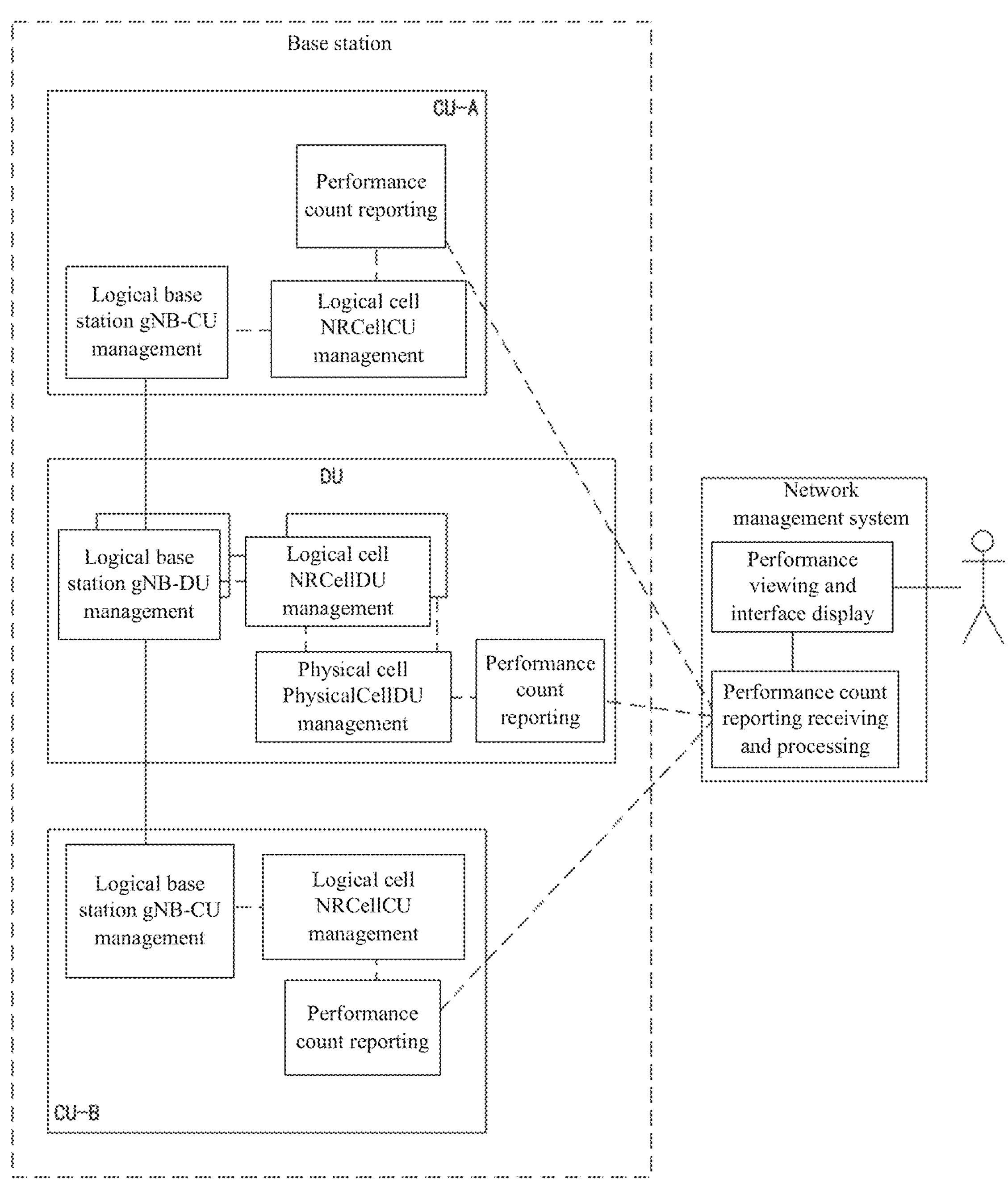
FIG. 2 is an architectural diagram of a shared network provided in another embodiment of the present disclosure.

It is to be noted that the implementation of the technical scheme of the present disclosure may be based on the architecture of the shared network shown in FIG. 2, which may include a base station and a network management system. The DU side of the base station may consist of a physical cell PhysicalCellDU management module, a logical cell NRCellDU management module, a logical base station gNB-DU management module, and a performance count reporting module, where the logical cell NRCellDU management module and the logical base station gNB-DU management module can be divided into multiple instances for different operators, and deal with related procedures and transactions of the logical cell and the logical base station of this operator on the DU side, respectively; the physical cell PhysicalCellDU management module is used to manage related procedures and transactions at the physical cell level; and the performance count reporting module can be used to collect performance counting events generated by other modules and organize and report them to the network management. The CU side of the base station may consist of a logical cell NRCellCU management module, a logical base station gNB-CU management module, and a performance count reporting module, where the logical cell NRCellCU management module and the logical base station gNB-CU management module are used to handle related procedures and transactions of the logical cell and the logical base station of this operator on the CU side; and the performance count reporting module is used to collect performance counting events generated by other modules in the CU side and organize and report them to the network management. It is worth noting that the three modules on the CU side for different operators can be deployed on different CU devices. The network management system may include modules related to performance counting, for example, it may include a performance count reporting receiving and processing module and a performance viewing and interface display module, where the performance count reporting receiving and processing module is used to receive performance count reporting information from the DU side or the CU side of the base station, and perform corresponding counting operations and calculations on corresponding management module objects in accordance with the reporting information; and the performance viewing and interface display module is used to receive a performance viewing command from the user, acquire a corresponding performance counting result from the performance count reporting receiving and processing module according to the requirements of the command, and display the result to the user on a network management interface.

It is worth noting that the above modules are all functional modules, and this embodiment does not limit the specific hardware structure, as long as the corresponding functions can be realized. Hereinafter, embodiments of the present disclosure are further elaborated in conjunction with the accompanying drawings.

Figure 1:
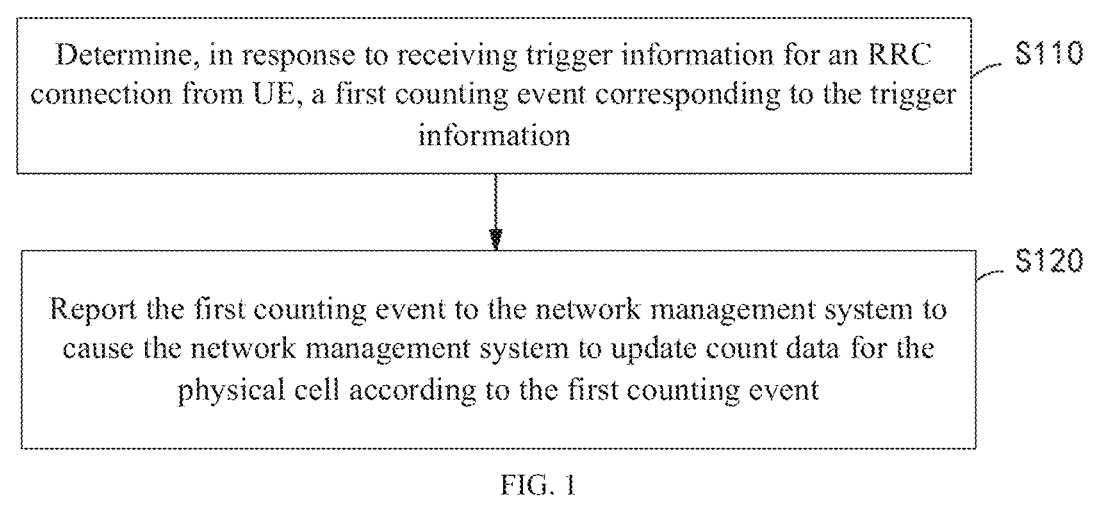

As shown in FIG. 1, which FIG. 1 is a flowchart of a method for acquiring count data provided in an embodiment of the present disclosure, the method for acquiring count data is applied to a physical DU of a physical cell, including, but not limited to, steps S110 and S120.

At S110, in response to receiving trigger information for an RRC connection from UE, a first counting event corresponding to the trigger information is determined.

It should be noted that, in accordance with the provisions of the relevant protocols, when the UE initiates RRC-related operations in a physical cell, it always needs to send a message to the physical DU of the physical cell, and the physical DU further selects logical base stations gNB-DU and gNB-CU to perform the subsequent operations, and as shown in FIG. 2, physical DUs of different operators are deployed on the same device, so count data for RRC connections collected through the physical DUs can be determined as count data for RRC connections for the entire physical cell. On this basis, a performance count reporting module can be configured in the physical DU as shown in FIG. 2, so as to realize the acquisition and reporting of the count data. The performance count reporting module is a functional module well known to those of skill in the art, and the specific configuration manner and count reporting method will not be further described herein.

It is worth noting that the trigger information for the RRC connection may be any message related to the RRC connection. In an embodiment, during the RRC setup phase, the trigger information may be an RRC setup request message or an RRC reestablishment request message. When the UE completes the setup of the RRC connection, it may be an RRC setup complete message or an RRC reestablishment complete message, and this embodiment does not impose much limitation on the type of the trigger information, as long as it is related to the RRC connection.

It should be noted that the first counting event may be determined for the trigger information. When the trigger information is an RRC setup request message, the first counting event may be the number of RRC setup requests being incremented by one. The specific description manner and data type may be adjusted according to the configuration of the network management system, as long as the network management system can be enabled by means of performance count reporting to determine the operation of the RRC connection that is to be performed at the DU side, or the first counting event may be determined in a manner similar to that of reporting count data at the CU side as specified in the relevant standards, and this embodiment does not impose much limitation thereon.

At S120, the first counting event is reported to the network management system to cause the network management system to update count data for the physical cell according to the first counting event.

It should be noted that since the first counting event is reported by the physical DU, the network management system may use the physical DU as the object to perform data counting for performance indicators. Of course, the counting object may also be configured in the physical DU in advance. In an embodiment, a physical cell object NRPhysicalCellDU is added on the DU side and the counting object NRPhysicalCellDU is reported at the same time when the first counting event is reported, and data counting can be configured in the network management system to be performed for this counting object, and when count data need to be acquired, it is sufficient to acquire the count data associated with the NRPhysicalCellDU object through the performance viewing and interface display module of the network management system. The above description of the physical object is only an exemplary description and is not a limitation of the technical scheme of this embodiment, and those of skill in the art, in the case where the first counting event is available, is motivated to select the counting method for count data of the physical cell in the network management system according to the actual situation.

It should be noted that, based on the above embodiments, the trigger information may be any message related to the RRC connection, and thus separate counting may be performed for different messages in the network management system. In an embodiment, the counting object corresponding to the physical DU is NRPhysicalCellDU, and when the acquired trigger information is an RRC setup request, the count of "RRC setup request" can be incremented by one for NRPhysicalCellDU. In another embodiment, after the RRC setup is complete, the physical DU receives the RRC setup complete message sent from the UE, then the trigger information is the RRC setup complete message, and the count of "RRC setup complete" can be incremented by one for the NRPhysicalCellDU.

It should be noted that the updating of count data by the network management system can be performed in the common way of incrementing the number by one, or other ways, as long as data counting can be realized, and this embodiment does not impose much limitation thereon.

It is worth noting that the way of recording count data can be adjusted according to the operation and maintenance requirements. In an embodiment, counting for the counting events reported in all triggering scenarios can be performed, and when operation and maintenance data are needed, it is sufficient to acquire the corresponding count data from the performance viewing and interface display module of the network management system shown in FIG. 2. In another embodiment, for the sake of saving network resources, if only the number of RRC setups needs to be counted, a counting policy can be issued through the network management system, so that the physical DU reports the first counting event only in the case of receiving an RRC setup message, and those of skill in the art are motivated to adjust the counting policy according to the actual needs, which will not be further described herein.

It is worth noting that, on the premise that count data is reported through the logical CU in the relevant standard, the adoption of the technical scheme of this embodiment enables the realization of data counting for the performance indicators of the physical cell, so that the operation and maintenance personnel can obtain the performance indicator zones of the physical cell and the logical cell from the network management system according to the needs, which can more effectively assist the operation and maintenance personnel in locating the network performance problems, thereby improving the efficiency and accuracy of the operation and maintenance.

Figure 3:
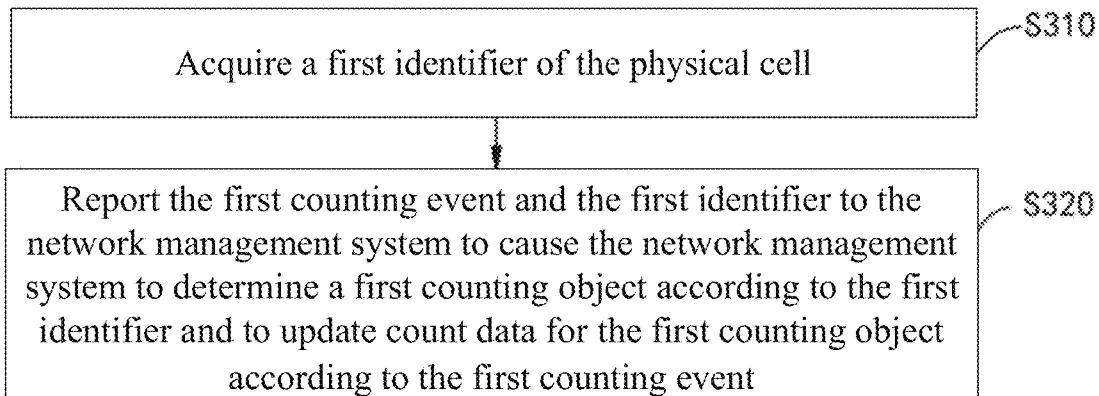
FIG. 3 is a flowchart of the reporting of a first counting event by a DU provided in another embodiment of the present disclosure.

Further, referring to FIG. 3, in an embodiment, step S120 shown in FIG. 1 further includes, but is not limited to, the following steps.

At S310, a first identifier of the physical cell is acquired.

At S320, the first counting event and the first identifier are reported to the network management system to cause the network management system to determine a first counting object according to the first identifier and to update count data for the first counting object according to the first counting event.

It should be noted that since the network management system is used to control a plurality of physical cells, for the accuracy of the determination the count data, the physical cell corresponding to the first counting event may be determined based on the first identifier, where the first identifier may be of any type as long as it can uniquely correspond to the physical cell and the network management system is capable of determining the corresponding physical cell based on the first identifier, which will not be further described herein.

It is to be noted that with reference to the description of the embodiment shown in FIG. 1, a counting object corresponding to each physical cell may be pre-configured in the network management system, where multiple types of count data may be included under one and the same counting object, and this embodiment does not impose much limitation thereon.

Figure 4:
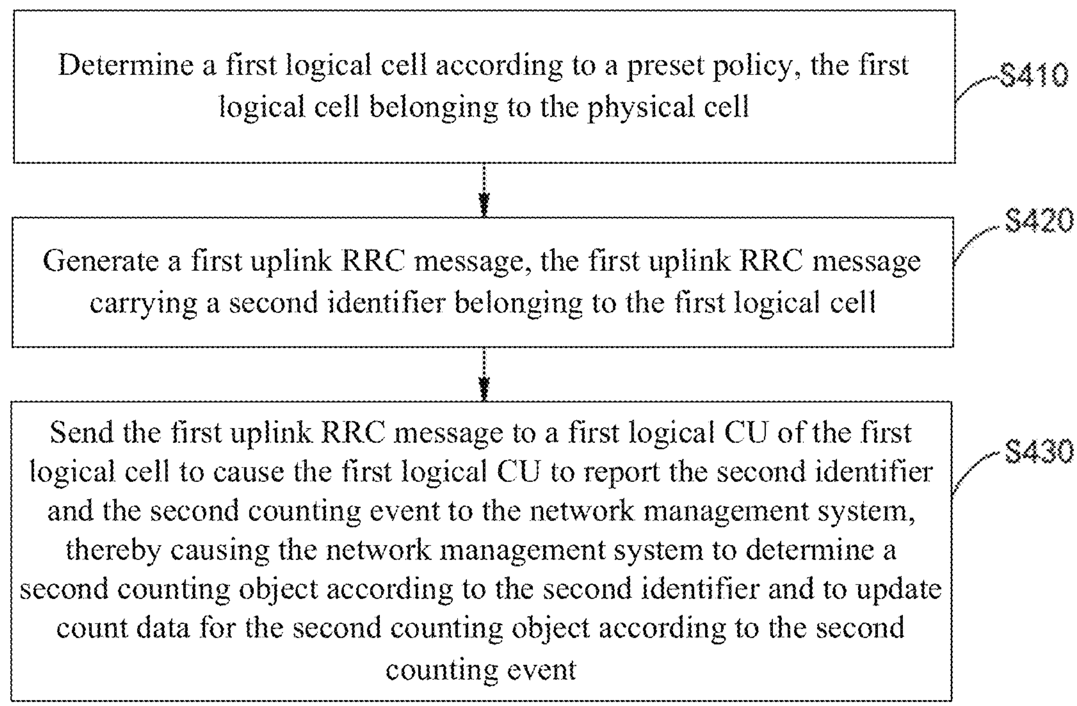
FIG. 4 is a flowchart of the reporting of a second counting event by a first logical CU provided in another embodiment of the present disclosure.

Further, referring to FIG. 4, in an embodiment, the trigger information is an RRC setup request message, and after step S120 shown in FIG. 1 is executed, the process further includes, but is not limited to, the following steps.

At S410, a first logical cell is determined according to a preset policy, the first logical cell belonging to the physical cell.

At S420, a first uplink RRC message is generated, the first uplink RRC message carrying a second identifier belonging to the first logical cell.

At S430, the first uplink RRC message is sent to a first logical CU of the first logical cell to cause the first logical CU to report the second identifier and a second counting event to the network management system, thereby causing the network management system to determine a second counting object according to the second identifier and to update count data for the second counting object according to the second counting event.

It is worth noting that in a network sharing scenario, different operators share the same physical cell, and the logical CUs of different operators can be deployed on different devices; therefore, when the UE initiates RRC access, after the physical DU receives the RRC setup request message, it needs to select the first logical cell first, and then sends access information for the UE to the first logical CU of the first logical cell to perform the subsequent operations. By contrast, in the RRC setup phase, the UE may select any one of the logical CUs to perform the setup of the RRC connection, and thus a preset policy may be preset to select the first logical cell from a plurality of logical cells to initiate the RRC connection, and the specific preset policy may be adjusted according to the actual needs, and this embodiment does not impose much limitation thereon.

It should be noted that for a network sharing scenario, one physical cell may be provided with multiple logical cells, and in order to differentiate among the logical cells, the logical cells are typically configured with NR cell global identifiers (NCGIs). A common NCGI identifier typically includes public land mobile network (PLMN) information, a global gNB identifier (gNBID), and a cell identifier cellID, and the PLMN information may be used to differentiate among different operators, and in the case where the logical CUs can be deployed on different devices, the NCGI may be used as a second identifier so that the network management system can identify the logical CU that sends out the uplink RRC message, and thus determine the second counting object corresponding to it.

It should be noted that since the trigger message is an RRC setup request and the second counting event is for the first logical CU, an object associated with the first logical CU may be selected as the second counting object. In an embodiment, the NRCellCU of the first logical CU may be taken as the second counting object. Of course, other objects may also be selected as the second counting object according to actual needs, as long as they can correspond to the first logical CU.

It is to be noted that since the first uplink RRC message is generated in response to the RRC setup request message, the second counting event may characterize the making of the RRC setup request by the first logical CU. In an embodiment, the number of RRC setup requests being incremented by one, such that the network management system increments the number of times the second counting object makes the RRC setup request by one, thereby completing the counting.

Figures 5, 6, 7:
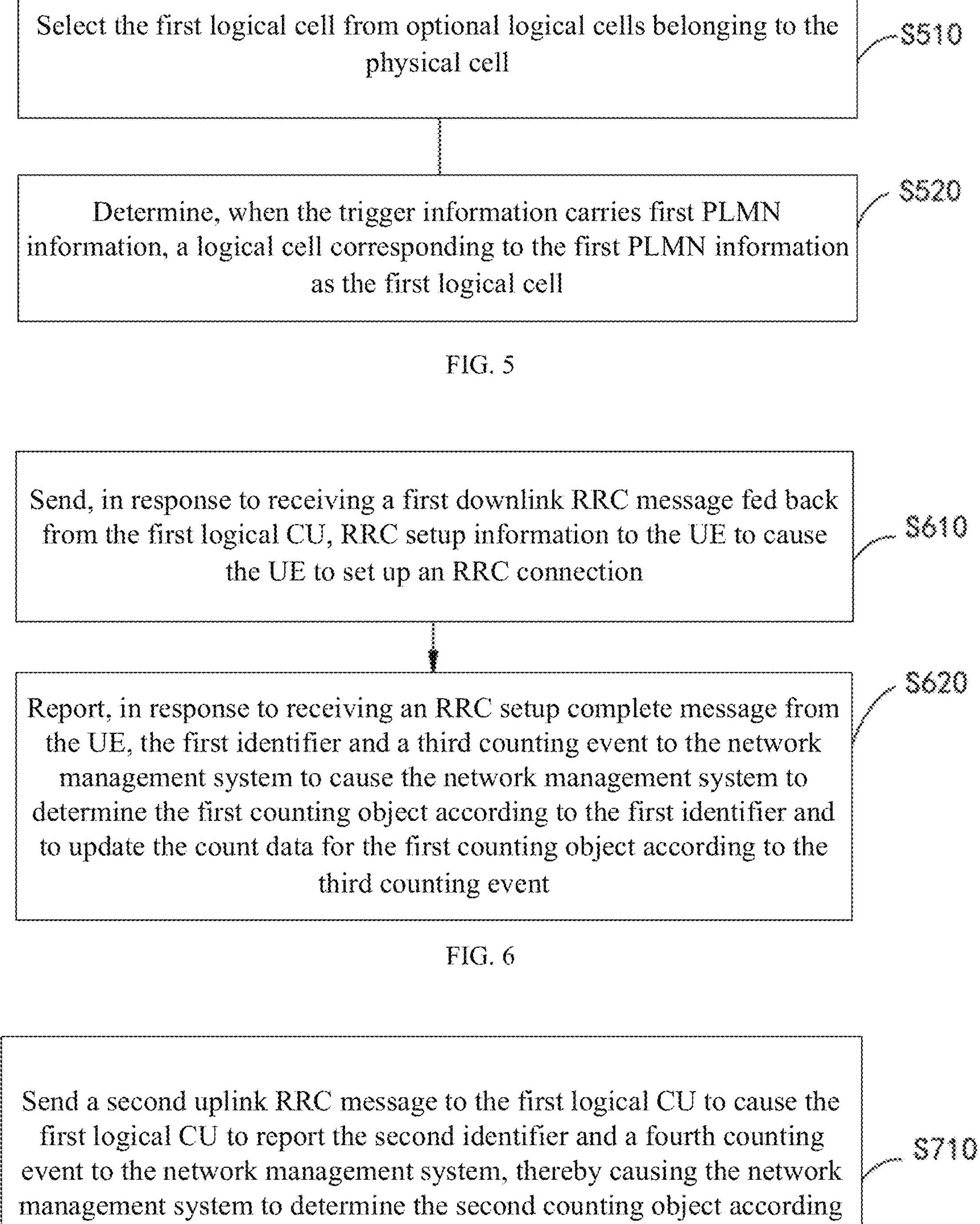
FIG. 5 is a flowchart of the determination of a first logical cell provided in another embodiment of the present disclosure.
FIG. 6 is a flowchart of the reporting of a third counting event by a DU provided in another embodiment of the present disclosure.
FIG. 7 is a flowchart of the reporting of a fourth counting event by a first logical CU provided in another embodiment of the present disclosure.

Further, referring to FIG. 5, in an embodiment, step S410 shown in FIG. 4 further includes, but is not limited to, the following steps.

At S510, the first logical cell is selected from optional logical cells belonging to the physical cell;

or at S520, when the trigger information carries first PLMN information, a logical cell corresponding to the first PLMN information is determined as the first logical cell.

It should be noted that the UE needs to select a first logical cell from a plurality of logical cells of the physical cell after accessing the physical cell in order to initiate the setup of the RRC connection, based on the description of the embodiment shown in FIG. 4. Although different logical cells correspond to different operators, according to the provisions of the relevant standard, the downlink RRC message replied to the DU by the logical CU after receiving the uplink RRC message will carry information about the correct operator, and the UE can simply set up the RRC connection with the correct logical CU directly according to the allocated RRC resources. Therefore, a random selection approach can be used to select any one of the optional logical cells belonging to the physical cell as the first logical cell.

It is to be noted that, in addition to randomly selecting the logical cell for access, the UE may also add the first PLMN information selected by the UE to the RRC setup request message. Since the PLMN information uniquely corresponds to the operator, the DU can accurately determine the operator to which the UE corresponds after receiving the first PLMN information. Further, according to the description of the above embodiments, the NCGI of the logical cell includes PLMN information, so that the first logical cell can be directly determined based on the first PLMN information, and the determined first logical cell is an accurate logical cell.

Further, referring to FIG. 6, in an embodiment, after the step S430 shown in FIG. 4 is executed, the process further includes, but not limited to, the following steps.

At S610, in response to receiving a first downlink RRC message fed back from the first logical CU, RRC setup information is sent to the UE to cause the UE to set up an RRC connection.

At S620, in response to receiving an RRC setup complete message from the UE, the first identifier and a third counting event are reported to the network management system to cause the network management system to determine the first counting object according to the first identifier and to update the count data for the first counting object according to the third counting event.

It is worth noting that after receiving the first downlink RRC message fed back from the first logical CU, it can be determined that the allocation of RRC connection resources for the UE has been completed, at which time the DU can send RRC setup information to the UE to enable the UE to set up an RRC connection. This embodiment does not involve improvements to the RRC setup process, which will not be further described herein.

It should be noted that, with reference to the description of the embodiment shown in FIG. 5, if the first logical cell is randomly selected, the first logical CU may be an incorrectly selected logical CU, but the correct logical CU can be selected according to the relevant standard to perform the RRC connection; therefore, regardless of whether the setup of the RRC connection continues to be completed through the first logical CU or whether another correct logical CU is selected for the RRC setup, the RRC setup is completed once for the physical cell. Therefore, after receiving the RRC setup complete message, it is an inevitable event that the UE completes the setup of the RRC connection in the physical cell, and thus the third counting event can be reported to the network management system for data counting before the UE completes the setup of the RRC connection with the logical CU, so as to complete the data counting of the RRC connection of the physical cell.

It is worth noting that the third counting event is directed to the completion of the setup of the RRC connection by the UE within the physical cell, so the third counting event may be the number of successful RRC setups being incremented by one, and the counting object is the first counting object corresponding to the first identifier. For specific methods of counting, reference may be made to the counting for the first counting event in the embodiment shown in FIG. 1, which will not be further described herein.

It is to be noted that after the physical DU reports the third counting event, for the first counting object, the count data obtained according to the first counting event and the data obtained according to the third counting event are stored in the network management system. Taking an RRC connection as an example, the count data obtained based on the first counting event may be the number of RRC setup requests, and the count data obtained based on the third counting event may be the number of RRC setup complete. With the above two count data, the success rate of RRC setups of the physical cell may be calculated as a performance indicator of RRC connection for the physical cell. Of course, the failure rate of the RRC setups may also be calculated according to the actual needs, which will not be further described herein as those of skill in the art are familiar with how to calculate the desired performance indicator when count data is available.

Further, in an embodiment, the RRC setup complete message carries second PLMN information, the second PLMN information belonging to a logical cell with which the UE has set up an RRC connection, and in the case where the second PLMN information matches the PLMN information of the first logical cell, with reference to FIG. 7, after step S620 shown in FIG. 6 is executed, the process further including, but not limited to, the following steps.

At S710, a second uplink RRC message is sent to the first logical CU to cause the first logical CU to report the second identifier and a fourth counting event to the network management system, thereby causing the network management system to determine the second counting object according to the second identifier and to update the count data for the second counting object according to the fourth counting event.

It is to be noted that, based on the description of the above embodiments, in the case where the first logical CU selected for the first time is randomly selected, there is a possibility that the first logical CU is not the logical CU that ultimately sets up the RRC connection with the UE, and according to the relevant standard, the RRC setup information carries the second PLMN information, thus enabling the UE to determine the logical CU corresponding to the operator it belongs to, and in the case where the second PLMN information matches the PLMN information of the first logical cell, the first logical cell is the correct logical cell and RRC setup is completed through the first logical CU.

It is to be noted that since the fourth counting event is carried by the first logical CU in the second uplink RRC message, it can characterize the completion of the RRC setup, so it is sufficient to perform counting for the second counting object corresponding to the second identifier. For the specific counting method, reference may be made to the method for the second counting event described above, which will not be repeated herein.

It should be noted that after the network management system is provided with the count data for the second counting event and the fourth counting event, the RRC connection performance indicators of the first logical CU can be calculated. In an embodiment, the count data obtained according to the second counting event is the number of RRC setup requests, and the count data obtained according to the fourth counting event is the number of RRC setup complete, and the second counting object is an NRCellCU, and therefore an RRC connection success rate or failure rate corresponding to the NRCellCU can be calculated. The specific type of the performance indicator can be selected according to the actual needs.

Further, in an embodiment, the RRC setup complete message carries second PLMN information, the second PLMN information belonging to a logical cell with which the UE has set up an RRC connection, and in the case where the second PLMN information does not match the PLMN information of the first logical cell, with reference to FIG. 8, after step S620 shown in FIG. 6 is executed, the process further including, but not limited to, the following steps.

At S810, a context release request is sent to the first logical CU to cause the first logical CU to report the second identifier and a fifth counting event to the network management system, thereby causing the network management system to determine the second counting object according to the second identifier and to update the count data for the second counting object according to the fifth counting event.

At S820, context information for the setup of an RRC connection of the UE with the first logical CU is released in response to receiving a context release response fed back from the first logical CU.

It should be noted that with reference to the description of the above embodiments, since the first logical CU may be randomly selected, there is a possibility that it is not the logical CU that ultimately sets up the RRC connection with the UE, and in the case where the second PLMN information is not consistent with the PLMN information of the first logical cell, it can be determined that the first logical CU is incorrectly selected, and the physical DU needs to re-select the correct logical cell and logical CU based on the second PLMN information. For the first logical CU, since it initiated the setup of the RRC connection, in order to reduce the occupation of resources, a context release request may be sent by the physical DU to the first logical CU to cause the first logical CU to respond and feedback a context release response, so as to release the context in the physical DU that is related to this RRC connection. In an embodiment, data associated with the UE that is stored in the first logical CU and the logical base station of the first logical cell is cleared.

It should be noted that, according to the existing standards, in the case where the first logical CU is an incorrectly selected logical CU, the network management system does not perform counting, but counting for the second counting event, i.e., the number of RRC setup requests, have already been performed, and it is not possible to determine whether the first logical CU is correct or not based on the reporting of the second counting event, and therefore the count data cannot reflect the correct RRC connection corresponding to the first logical CU. Therefore, the count data corresponding to the second counting event alone cannot reflect the situation in which the RRC connection is correctly set up for that first logical CU, which hinders the making of operation and maintenance decisions. Thus, the first logical CU may also report the second identifier and the fifth counting event to the network management system after receiving the context release request, such that the network management system determines that this RRC setup request is an incorrect connection. In an embodiment, the fifth counting event may be incorrect logical CU selections and carry incorrectness information, which, for example, may be recorded as "PLMN not served by the CU", so that the operator, after exporting the count data based on the second identifier, can obtain the number of RRC setup requests corresponding to the second counting event, the number of RRC setup complete corresponding to the fourth counting event, and the number of incorrect logical CU selections corresponding to the fifth counting event, and on the basis of the above data, the accuracy of the operation and maintenance decisions can be effectively improved. In an embodiment, when the number of the fifth counting event is high, optimization may also be performed for the physical DU to improve the accuracy of the first selection of the logical CU.

Further, referring to FIG. 9, in an embodiment, after the step S820 shown in FIG. 8 is executed, the process further includes, but not limited to, the following steps.

At S910, a second logical cell is determined according to the second PLMN information.

At S920, a third uplink RRC message carrying a target field is sent to a second logical CU of the second logical cell to cause the second logical CU to report a third identifier and a sixth counting event to the network management system in response to the target field, thereby causing the network management system to determine a third counting object according to the third identifier and to update count data for the third counting object according to the sixth counting event, where the target field characterizes previous RRC setup complete of the UE with the second logical CU, and the third identifier belongs to the second logical cell.

It is to be noted that based on the description of the above embodiments, when the first logical CU is incorrectly selected, a second logical cell may be determined based on the second PLMN information, so as to complete the setup of the RRC connection based on the second logical CU of the second logical cell. For the second logical CU, the third uplink RRC message and the first uplink RRC message are both uplink RRC messages, and in order to differentiate between them, a target field may be introduced in the uplink RRC message to describe the situation of RRC setup. In an embodiment, the common RRC-Container-RRCSetupComplete may be used, and when the first uplink RRC message does not carry the RRC-Container-RRCSetupComplete, the logical CU receiving the first uplink RRC message can determine that the RRC setup request is a new setup request. In another embodiment, if the third uplink RRC message carries RRC-Container-RRCSetupComplete, the logical CU receiving the third uplink RRC message may determine that this RRC setup request has been completed and the subsequent setup procedure may be performed. Of course, other descriptive fields can be selected according to the actual needs, which will not be limited herein.

It is to be noted that for the third identifier, NCGI information may be adopted with reference to the second identifier described in the above embodiments, and for the third counting object, the NRCellCU corresponding to the second logical cell may also be adopted, and that the sixth counting event may include an RRC setup request and an RRC setup complete reported by the second logical CU. Of course, it is also possible to separate the two counting events for reporting, and this embodiment does not impose much limitation thereon. For the count data for the RRC setup request, reference may be made to the description of the embodiment shown in FIG. 4, and for the count data for the RRC setup complete, reference may be made to the description of the embodiment shown in FIG. 8, the difference mainly being that this embodiment determines the third counting object by means of the third identifier, and for the sake of simplicity of description, it will not be repeated herein.

Furthermore, with reference to FIG. 10, embodiments of the present disclosure also provide a method for acquiring count data applied to a network management system, the network management system being communicatively connected to a physical DU of a physical cell, the method for acquiring count data including, but not limited to, the following steps.

At S1010, a first counting event reported by the physical DU is acquired, where the first counting event is determined by the physical DU according to trigger information for an RRC connection, the trigger information being from UE.

At S1020, count data for the physical cell is updated according to the first counting event.

It should be noted that the technical scheme of this embodiment is similar to the technical scheme of the embodiment shown in FIG. 1, the difference mainly being that the execution subject of this embodiment is a network management system. For the sake of simplicity of description, for the specific principle of acquiring count data, reference may be made to the description of the embodiment shown in FIG. 1, which will not be repeated herein.

It should be noted that since the network management system can manage and control the physical cell, a counting policy may also be issued to the physical cell according to the actual needs. In an embodiment, counting can be performed only on the count data reported by the physical DU, or only on the count data reported by the logical CU, or on the count data reported by both the physical DU and the logical CU. Those of skill in the art are motivated to adjust the counting policy according to the actual needs, which will not be limited herein.

It should be noted that the network management system as shown in FIG. 2 can be used to view count data via the performance viewing and interface display module. In an embodiment, the first identifier can be entered, so as to acquire count data for the physical cell. In another embodiment, the count data for the corresponding logical CU is obtained by means of the second identifier or the third identifier, and the specific method of acquiring and displaying the count data is known to those of skill in the art, which will not be further described herein.

Further, in an embodiment, step S1020 shown in FIG. 10 further includes, but is not limited to, the following steps.

At S1110, a first identifier reported by the physical DU is acquired, and a first counting object is determined according to the first identifier, where the first identifier belongs to the physical cell.

At S1120, count data for the first counting object is updated according to the first counting event.

It should be noted that the technical scheme of this embodiment is similar to the technical scheme of the embodiment shown in FIG. 3, the difference mainly being that the execution subject of this embodiment is a network management system. For the sake of simplicity of description, for the specific principle, reference may be made to the description of the embodiment shown in FIG. 3, which will not be repeated herein.

Further, in an embodiment, the trigger information is an RRC setup request message, and with reference to FIG. 12, after step S1020 shown in FIG. 10 is executed, the process further includes, but is not limited to, the following steps.

At S1210, the first identifier and a third counting event that are reported by the physical DU in the event of receiving an RRC setup complete message sent from the UE are acquired.

At S1220, the first counting object is determined according to the first identifier.

At S1230, the count data for the first counting object is updated according to the third counting event.

It should be noted that the technical scheme of this embodiment is similar to the technical scheme of the embodiment shown in FIG. 6, the difference mainly being that the execution subject of this embodiment is a network management system. For the sake of simplicity of description, for the specific principle, reference may be made to the description of the embodiment shown in FIG. 6, which will not be repeated herein.

Figure 13:
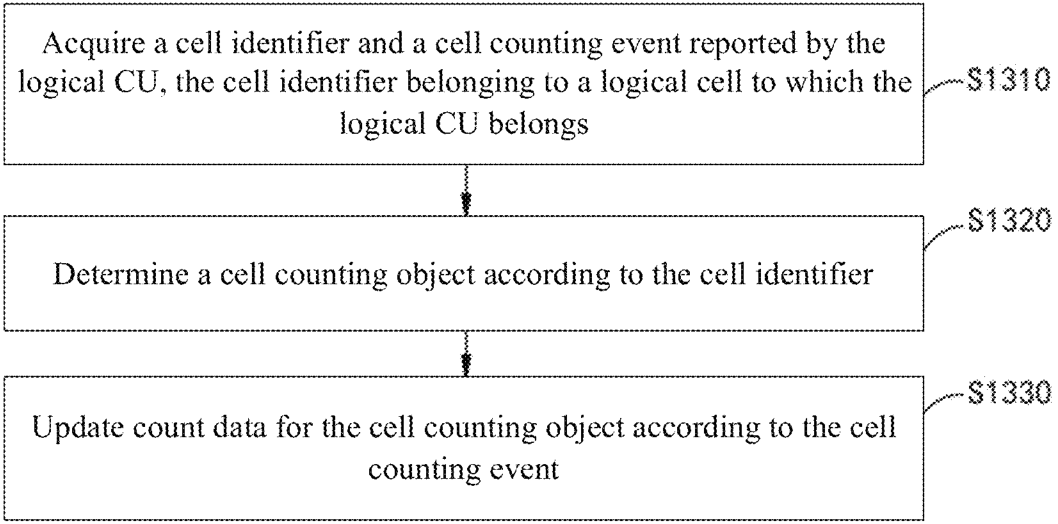
FIG. 13 is a flowchart for the counting of data of a logical cell provided in another embodiment of the present disclosure.

Further, in an embodiment, the network management system is communicatively connected to a logical CU, and with reference to FIG. 13, after step S1020 shown in FIG. 10 is executed, the process further includes, but is not limited to, the following steps.

At S1310, a cell identifier and a cell counting event reported by the logical CU are acquired, the cell identifier belonging to a logical cell to which the logical CU belongs.

At S1320, a cell counting object is determined according to the cell identifier.

At S1330, count data for the cell counting object is updated according to the cell counting event.

It should be noted that for the network management system, it will not know in advance whether the logical CU that sends the counting event is the one that ultimately sets up the RRC connection with the UE; therefore, when the reporting of the cell identifier and the cell counting event is the setup phase of the RRC connection, the logical CU is equivalent to the first logical CU shown in FIGS. 4 and 7, and the cell identifier is equivalent to the second identifier shown in FIGS. 4 and 7, and the cell counting event may be either the second counting event shown in FIG. 4 or the fourth counting event shown in FIG. 7. For the specific technical principles, reference may be made to the description of the embodiments shown in FIGS. 4 and 7, the difference mainly being that the execution subject of this embodiment is the network management system, and for the sake of simplicity of description, it will not be repeated herein.

It is to be noted that if the logical CU reporting the cell identifier and the counting event is the logical CU first determined through RRC-Container-RRCSetupComplete to be the logical CU that sets up the RRC connection with the UE, this logical CU is equivalent to the second logical CU of the embodiment shown in FIG. 9, the cell identifier is equivalent to the third identifier shown in FIG. 9, and the cell counting event may be the sixth counting event shown in FIG. 9. For the specific technical principles, reference may be made to the description of the embodiment shown in FIG. 9, the difference mainly being that the execution subject of this embodiment is the network management system, and for the sake of simplicity of description, it will not be repeated herein.

In order to better illustrate the technical schemes of the present disclosure, three specific examples are presented below, and it is to be noted that in the following three specific examples, illustration is provided taking examples where the first logical CU is a CU-A, the second logical CU is a CU-B, the first identifier is a physical cell identifier, the second identifier is an NCGI-A, the third identifier is an NCGI-B, the PLMN information of the first logical cell is PLMN-A, and the PLMN information of the second logical cell is PLMN-B.

Figure 14:
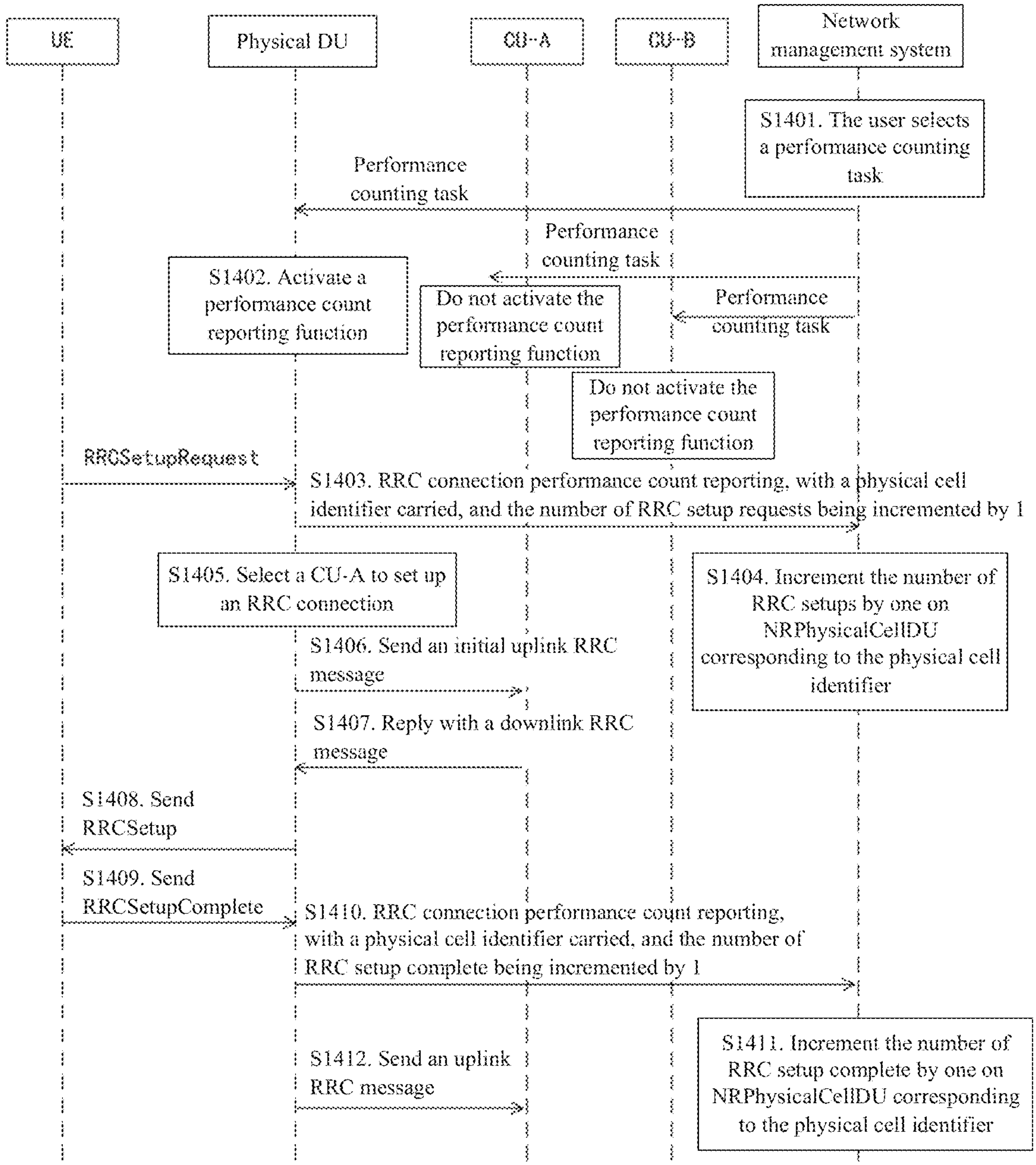
FIG. 14 is a flowchart of Example I provided in the present disclosure.

Example I: only counting for the count data reported by the physical DU is performed. Referring to FIG. 14, this example includes, but is not limited to, the following steps.

At S1401, the user configures a performance counting task in the network management system to perform counting only on performance indicator data at the physical cell level, and issues the performance counting task to the physical DU, the CU-A, and the CU-B.

At S1402, after receiving the performance counting task, the physical DU, the CU-A and the CU-B resolve it to derive that the task is to perform counting only on the count data at the physical cell level, and then the physical DU activates the performance count reporting, while the CU-A and the CU-B do not activate the performance count reporting.

At S1403, after receiving the RRC setup request message from the UE, the physical DU reports the RRC connection performance count to the network management system, where the counting object is the physical cell "NRPhysicalCellDU" and the physical cell identifier is carried, and the event is the number of RRC setup requests being incremented by 1.

At S1404, after receiving the RRC connection performance count reporting message from the physical DU, the network management system increments the number of RRC setups by one on the "NRPhysicalCellDU" object indicated by the physical cell identifier.

At S1405, the physical DU randomly selects, in accordance with the information of the physical cell accessed by the UE and the information of the operators sharing the physical cell resource, a logical cell corresponding to one of the operators, as well as the logical base station DU and the logical base station CU-A corresponding to the logical cell or, alternatively, selects, in accordance with the PLMN information explicitly carried in the RRC setup request message of the UE, a logical cell corresponding to that PLMN, and the logical base station physical DU and the logical base station CU-A corresponding to that logical cell.

At S1406, the physical DU sends an initial uplink RRC message to the selected CU-A, the initial uplink RRC message carrying an NCGI-A.

At S1407, the CU-A replies to the physical DU with a downlink RRC message.

At S1408, after receiving the downlink RRC message from the CU-A, the physical DU sends an RRC setup message to the UE.

At S1409, the UE replies to the physical DU with an RRC setup complete message and carries the PLMN-A therein.

At S1410, after receiving the RRC setup complete message from the UE, which indicates that the RRC setup is complete, the physical DU reports the RRC performance count to the network management system, where the counting object is the physical cell "NRPhysicalCellDU" and the physical cell identifier is carried, and the event is the number of RRC setup complete being incremented by 1.

At S1411, after receiving the RRC connection performance count reporting message from the physical DU, the network management system increments the number of RRC setup complete by one on the "NRPhysicalCellDU" object indicated by the physical cell identifier.

At S1412, the physical DU sends an uplink RRC message to the CU-A that carries RRC-Container-RRCSetupComplete and the CU-A completes the subsequent RRC setup procedure.

Figure 15:
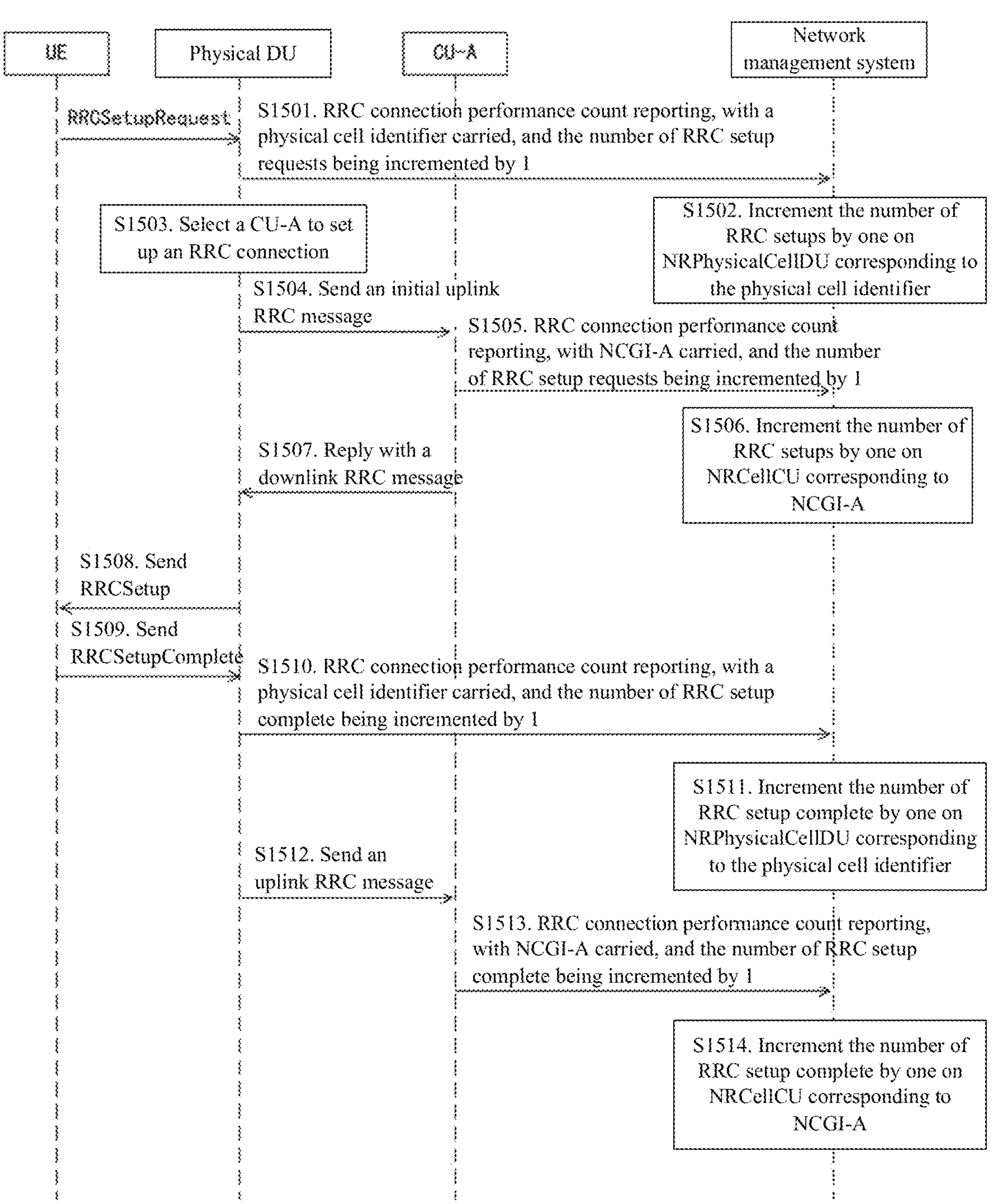
FIG. 15 is a flowchart of Example II provided in the present disclosure.

Example II: counting for the count data for both the physical DU and the logical CU is performed at the same time and the first selected CU-A is the correct logical CU. Referring to FIG. 15, this example includes, but is not limited to, the following steps.

At S1501, after receiving the RRC setup request message from the UE, the physical DU reports the RRC connection performance count to the network management system, where the counting object is the physical cell "NRPhysicalCellDU" and the physical cell identifier is carried, and the event is the number of RRC setup requests being incremented by 1.

At S1502, after receiving the RRC connection performance count reporting message from the physical DU, the network management system increments the number of RRC setups by one on the "NRPhysicalCellDU" object indicated by the physical cell identifier.

At S1503, the physical DU randomly selects, in accordance with the information of the physical cell accessed by the UE and the information of the operators sharing the physical cell resource, a logical cell corresponding to one of the operators, as well as the logical base station DU and the logical base station CU-A corresponding to the logical cell or, alternatively, selects, in accordance with the PLMN information explicitly carried in the RRC setup request message of the UE, a logical cell corresponding to that PLMN, and the logical base station physical DU and the logical base station CU-A corresponding to that logical cell.

At S1504, the physical DU sends an initial uplink RRC message to the selected CU-A, the message carrying the NCGI-A.

At S1505, after receiving the initial uplink RRC message from the physical DU, the CU-A saves the NCGI-A carried in the message, and determines that the message does not carry RRC-Container-RRCSetupComplete, which indicates a new RRC setup, and reports the RRC connection performance count to the network management system, where the counting object is the logical cell "NRCellCU", the logical cell identifier is NCGI-A, and the event is the number of RRC setup requests being incremented by 1.

At S1506, after receiving the RRC connection performance count reporting message from the CU-A, the network management system increments the number of RRC setups by one on the "NRCellCU" object indicated by the NCGI-A.

At S1507, the CU-A replies to the physical DU with a downlink RRC message.

At S1508, after receiving the downlink RRC message from the CU-A, the physical DU sends an RRC setup message to the UE.

At S1509, the UE replies to the physical DU with RRC setup complete, the message carrying the PLMN-A therein.

At S1510, after receiving the RRC setup complete message from the UE, which indicates that the RRC setup is complete, the physical DU reports the RRC performance count to the network management system, where the counting object is the physical cell "NRPhysicalCellDU" and the physical cell identifier is carried, and the event is the number of RRC setup complete being incremented by 1.

At S1511, after receiving the RRC connection performance count reporting message from the physical DU, the network management system increments the number of RRC setup complete by one on the "NRPhysicalCellDU" object indicated by the physical cell identifier.

At S1512, the physical DU sends an uplink RRC message to the CU-A, the message carrying RRC-Container-RRCSetupComplete.

At S1513, after receiving the uplink RRC message from the physical DU, the CU-A determines that the message carries RRC-Container-RRCSetupComplete, which indicates that the RRC setup is complete, and reports the RRC connection performance count to the network management system, where the counting object is the logical cell "NRCellCU", the logical cell identifier is NCGI-A, and the event is the number of RRC setup complete being incremented by 1.

At S1514, after receiving the RRC connection performance count reporting message from the CU-A, the network management system increments the number of RRC setup complete by one on the "NRCellCU" object indicated by the NCGI-A.

Figure 16:
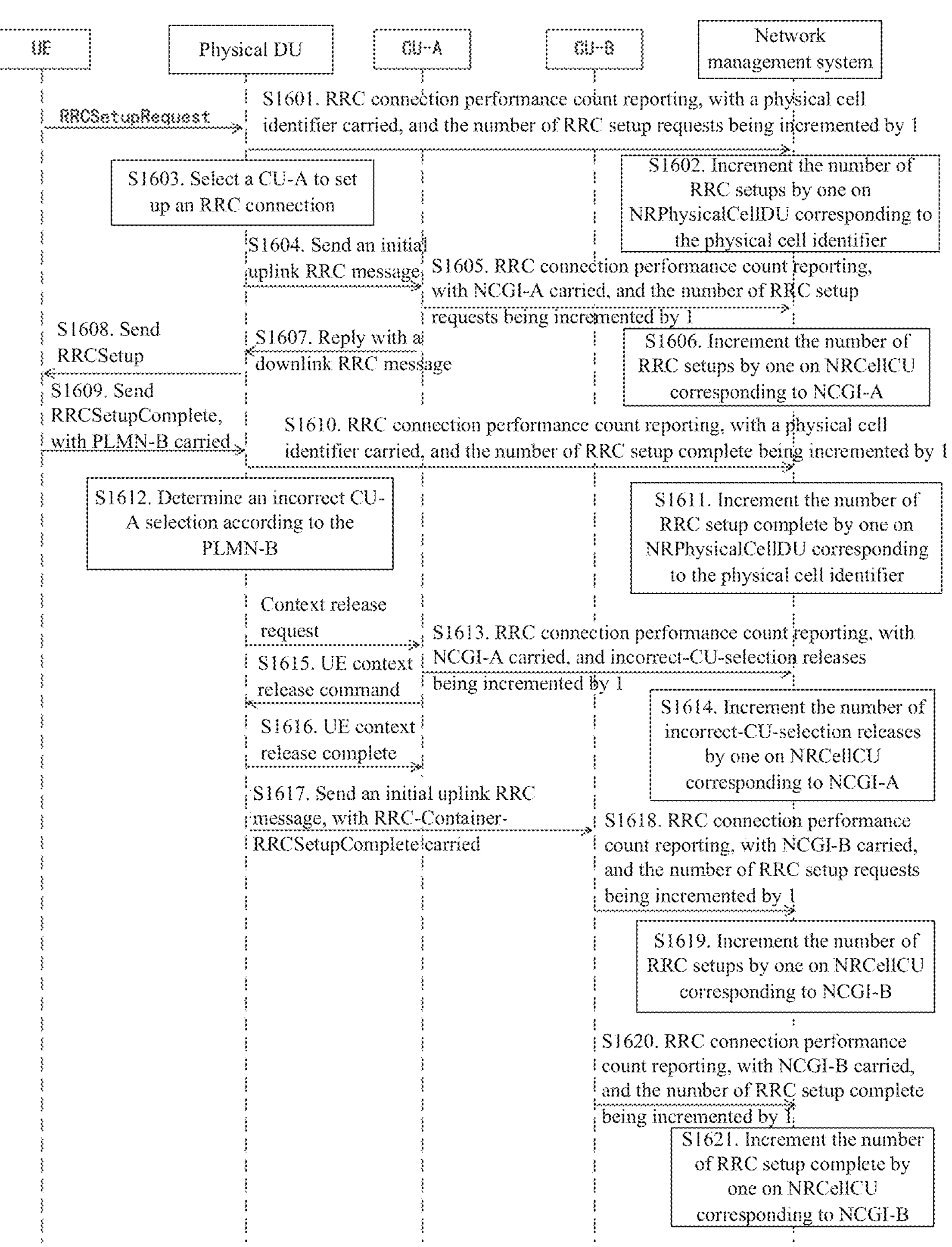
FIG. 16 is a flowchart of Example III provided in the present disclosure.

Example III: counting for the count data for both the physical DU and the logical CU is performed at the same time and the first selected CU-A is an incorrect logical CU while the correct logical CU is the CU-B. Referring to FIG. 16, this example includes, but is not limited to, the following steps.

At S1601, after receiving the RRC setup request message from the UE, the physical DU reports the RRC connection performance count to the network management system, where the counting object is the physical cell "NRPhysicalCellDU" and the physical cell identifier is carried, and the event is the number of RRC setup requests being incremented by 1.

At S1602, after receiving the RRC connection performance count reporting message from the physical DU, the network management system increments the number of RRC setups by one on the "NRPhysicalCellDU" object indicated by the physical cell identifier.

At S1603, the physical DU randomly selects, in accordance with the information of the physical cell accessed by the UE and the information of the operators sharing the physical cell resource, a logical cell corresponding to one of the operators, as well as the logical base station DU and the logical base station CU-A corresponding to the logical cell or, alternatively, selects, in accordance with the PLMN information explicitly carried in the RRC setup request message of the UE, a logical cell corresponding to that PLMN, and the logical base station physical DU and the logical base station CU-A corresponding to that logical cell.

At S1604, the physical DU sends an initial uplink RRC message to the selected CU-A, the message carrying the NCGI-A.

At S1605, after receiving the initial uplink RRC message from the physical DU, the CU-A saves the NCGI-A carried in the message, and determines that the message does not carry RRC-Container-RRCSetupComplete, which indicates a new RRC setup, and reports the RRC connection performance count to the network management system, where the counting object is the logical cell "NRCellCU", the logical cell identifier is NCGI-A, and the event is the number of RRC setup requests being incremented by 1.

At S1606, after receiving the RRC connection performance count reporting message from the CU-A, the network management system increments the number of RRC setups by one on the "NRCellCU" object indicated by the NCGI-A.

At S1607, the CU-A replies to the physical DU with a downlink RRC message.

At S1608, after receiving the downlink RRC message from the CU-A, the physical DU sends an RRC setup message to the UE.

At S1609, the UE replies to the physical DU with RRC setup complete, the message carrying the PLMN-B therein.

At S1610, after receiving the RRC setup complete message from the UE, which indicates that the RRC setup is complete, the physical DU reports the RRC performance count to the network management system, where the counting object is the physical cell "NRPhysicalCellDU" and the physical cell identifier is carried, and the event is the number of RRC setup complete being incremented by 1.

At S1611, after receiving the RRC connection performance count reporting message from the physical DU, the network management system increments the number of RRC setup complete by one on the "NRPhysicalCellDU" object indicated by the physical cell identifier.

At S1612, the physical DU determines an incorrect CU-A selection based on the PLMN-B carried in the RRC setup complete message, and sends a UE context release request message to the CU-A with the reason for release carried in the message as "PLMN not served by the CU".

At S1613, after receiving the UE context release request message from the physical DU, with the cause for release being "PLMN not served by the CU", the CU-A determines an incorrect CU selection, and reports the RRC connection performance count to the network management system, where the counting object is the logical cell "NRCellCU", the logical cell identifier is NCGI-A, and event is the number of UE releases for the cause of "PLMN not served by the CU" being incremented by 1.

At S1614, after receiving the RRC connection performance count reporting message from the CU-A, the network management system increments, according to the content of the message, the number of UE releases for the cause of "PLMN not served by the CU" by one on the "NRCellCU" object indicated by the NCGI-A.

At S1615, the CU-A sends a UE context release command to the physical DU.

At S1616, after receiving the UE context release command from the CU-A, the physical DU clears data related to this UE saved on the logical cell and the logical base station corresponding to the operator A, and replies to the CU-A with UE context release complete.

At S1617, the physical DU re-determines for the UE that the CU-B is the correct logical CU and sends an uplink RRC message to the CU-B, the message carrying RRC-Container-RRCSetupComplete, PLMN-B, and NCGI-B.

At S1618, after receiving the initial uplink RRC message from the DU, the CU-B saves the NCGI-B carried in the message, and determines that the message carries RRC-Container-RRCSetupComplete, and reports the RRC connection performance count to the network management, where the counting object is the logical cell "NRCellCU", the logical cell identifier is NCGI-B, and the event is the number of RRC setup requests being incremented by 1.

At S1619, after receiving the RRC connection performance count reporting message from the CU-B, the network management system increments the number of RRC setup requests by one on the "NRCellCU" object indicated by the NCGI-B.

At S1620, the CU-B reports the RRC connection performance count to the network management, where the counting object is the logical cell "NRCellCU", the logical cell identifier is NCGI-B, and the event is the number of RRC setup complete being incremented by 1.

At S1621, after receiving the RRC connection performance count reporting message from the CU-B, the network management system increments the number of RRC setup complete by one on the "NRCellCU" object indicated by the NCGI-B.

Figure 17:
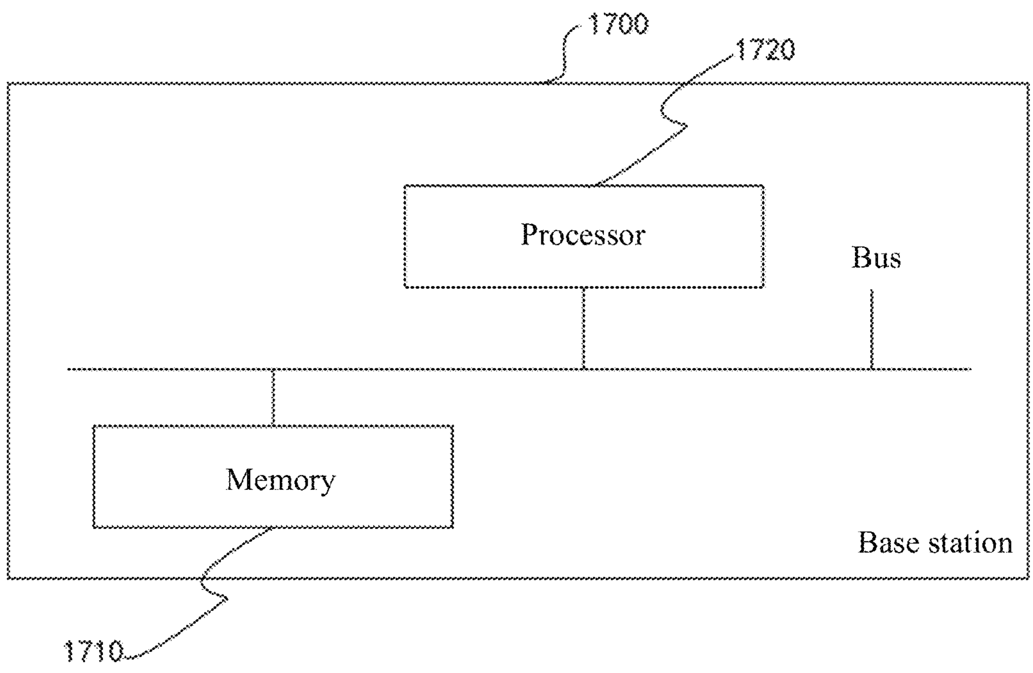
FIG. 17 is an apparatus diagram of a base station provided in another embodiment of the present disclosure.

Further, referring to FIG. 17, an embodiment of the present disclosure also provides a base station, the base station 1700 may include: a memory 1710, a processor 1720, and a computer program stored in the memory 1710 and executable by the processor 1720.

The processor 1720 and the memory 1710 may be connected by a bus or by other means.

The above memory 1710 and processor 1720 may be specifically located in a DU in the base station.

A non-transitory software program and instructions required to implement the method for acquiring count data of the above embodiments are stored in the memory 1710, which, when executed by the processor 1720, execute the method for acquiring count data of the above embodiments, for example, by executing the above-described method steps S110 to S120 in FIG. 1, method steps S310 to S320 in FIG. 3, method steps S410 to S430 in FIG. 4, method steps S510 to S520 in FIG. 5, method steps S610 to S620 in FIG. 6, method step S710 in FIG. 7, method steps S810 to S820 in FIG. 8, and method steps S910 to S920 in FIG. 9.

Figure 18:
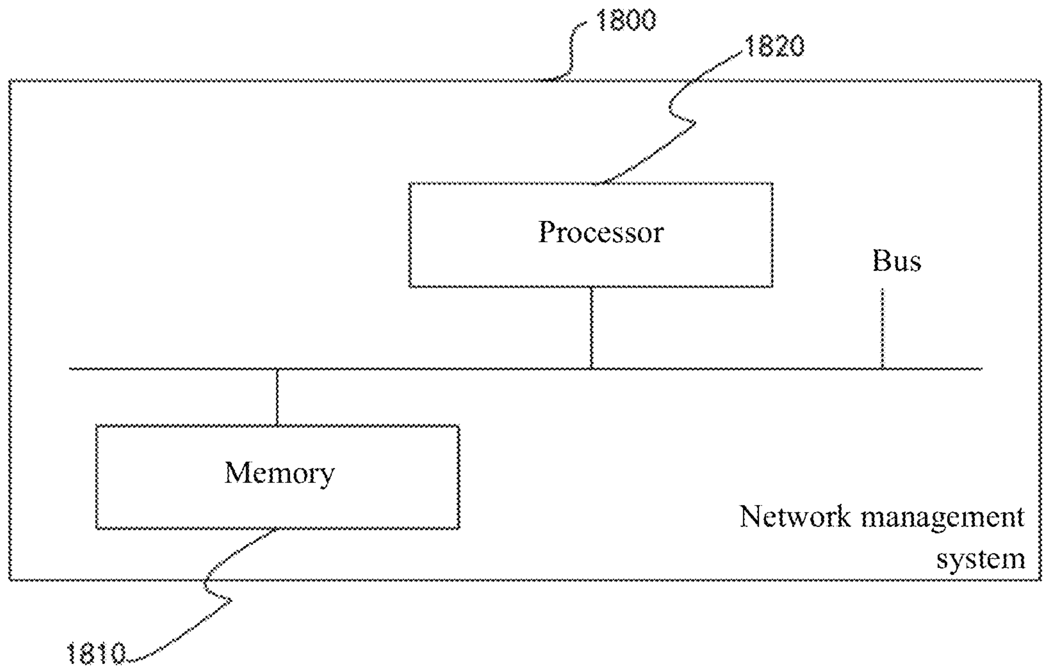
FIG. 18 is an apparatus diagram of a network management system provided in another embodiment of the present disclosure.

Further, referring to FIG. 18, an embodiment of the present disclosure also provides a network management system, the network management system 1800 may include: a memory 1810, a processor 1820, and a computer program stored in the memory 1810 and executable by the processor 1820.

The processor 1820 and the memory 1810 may be connected by a bus or by other means.

A non-transitory software program and instructions required to implement the method for acquiring count data of the above embodiments are stored in the memory 1810, which, when executed by the processor 1820, execute the method for acquiring count data of the above embodiments, for example, by executing the above-described method steps S1010 to S1020 in FIG. 10, method steps S1110 to S1120 in FIG. 11, method steps S1210 to step S1230 in FIG. 12, and method steps S1310 to S1330 in FIG. 13.

The apparatus embodiments described above are only for illustration. The units described as separate components may or may not be physically separated, that is, they may be located at one place or distributed to multiple network units. Some or all of the modules can be selected according to actual needs to achieve the purpose of the scheme of this embodiment.

Furthermore, an embodiment of the present disclosure also provides a computer-readable storage medium storing computer-executable instructions, where the computer-executable instructions, when executed by a processor or a controller, for example, a processor in the above-described base station embodiments, can cause the above-described processor to execute the method for acquiring count data in the above-described embodiments, for example, by executing the above-described method steps S110 to S120 in FIG. 1, method steps S310 to S320 in FIG. 3, method steps S410 to S430 in FIG. 4, method steps S510 to S520 in FIG. 5, method steps S610 to S620 in FIG. 6, method step S710 in FIG. 7, method steps S810 to S820 in FIG. 8, and method steps S910 to S920 in FIG. 9. As another example, the computer-executable instructions, when executed by a processor in the above-described network management system embodiments, can cause the above-described processor to execute the method for acquiring count data in the above-described embodiments, for example, by executing method steps S1010 to S1020 in FIG. 10, method steps S1110 to S1120 in FIG. 11, method steps S1210 to step S1230 in FIG. 12, and method steps S1310 to S1330 in FIG. 13. It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on a computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to a random access memory (RAM), a read-only memory (ROM), an electrically erasable programmable read-only memory (EEPROM), a flash memory or another memory technology, a compact disc read-only memory (CD-ROM), a digital versatile disk (DVD) or another optical disk storage, a magnetic cassette, a magnetic tape, magnetic disk storage or another magnetic storage apparatus, or any other medium that can be used to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media.

In summary, embodiments of the present disclosure provide a method for acquiring count data, a base station, a network management system, and a storage medium, which are capable of counting the KPIs of an RRC connection of a physical cell, thereby improving the convenience of operation and maintenance.

Embodiments of the present disclosure include: determining, in response to receiving trigger information for an RRC connection from UE, a first counting event corresponding to the trigger information; and reporting the first counting event to the network management system to cause the network management system to update count data for the physical cell according to the first counting event. According to the technical scheme of this embodiment, the physical DU reports a counting event to the network management system using the information for the RRC connection that is sent from the UE as a trigger condition, which realizes data counting for the RRC connection of the physical cell, provides a data base for the operation and maintenance of the physical cell, and improves the comprehensiveness of the operation and maintenance.

The above is a detailed description of some implementations of the present disclosure, but the present disclosure is not limited to the above-mentioned embodiments. Those of ordinary skill in the art can also make various equivalent modifications or replacements without departing from the principle of the present disclosure, and these equivalent modifications or replacements are all included in the scope defined by the claims of the present disclosure.

The invention claimed is:

1. A method for acquiring count data, applied to a physical distributed unit (DU) of a physical cell, the physical DU being communicatively connected to a network management system, the method comprising:

determining, in response to receiving trigger information for a radio resource control (RRC) connection from user equipment (UE), a first counting event corresponding to the trigger information; and reporting the first counting event to the network management system to cause the network management system to update count data for the physical cell according to the first counting event.

2. The method of claim 1, wherein said reporting the first counting event to the network management system to cause the network management system to update count data for the physical cell according to the first counting event comprises:

acquiring a first identifier of the physical cell; and reporting the first counting event and the first identifier to the network management system to cause the network management system to determine a first counting object according to the first identifier and to update count data for the first counting object according to the first counting event.

3. The method of claim 2, wherein the trigger information is an RRC setup request message, and after said reporting the first counting event to the network management system, the method further comprises:

determining a first logical cell according to a preset policy, the first logical cell belonging to the physical cell;

generating a first uplink RRC message, the first uplink RRC message carrying a second identifier belonging to the first logical cell; and sending the first uplink RRC message to a first logical centralized unit (CU) of the first logical cell to cause the first logical CU to report the second identifier and a second counting event to the network management system, thereby causing the network management system to determine a second counting object according to the second identifier and to update count data for the second counting object according to the second counting event.

4. The method of claim 3, wherein said determining a first logical cell according to a preset policy comprises:

selecting the first logical cell from optional logical cells belonging to the physical cell; or determining, when the trigger information carries first public land mobile network (PLMN) information, a logical cell corresponding to the first PLMN information as the first logical cell.

5. The method of claim 3, wherein after said sending the first uplink RRC message to a first logical CU of the first logical cell, the method further comprises:

sending, in response to receiving a first downlink RRC message fed back from the first logical CU, RRC setup information to the UE to cause the UE to set up an RRC connection;

reporting, in response to receiving an RRC setup complete message from the UE, the first identifier and a third counting event to the network management system to cause the network management system to determine the first counting object according to the first identifier and to update the count data for the first counting object according to the third counting event.

6. The method of claim 5, wherein the RRC setup complete message carries second PLMN information, the second PLMN information belonging to a logical cell with which the UE has set up an RRC connection, and in the case where the second PLMN information matches the PLMN information of the first logical cell, after said reporting the first identifier and the third counting event to the network management system, the method further comprising:

sending a second uplink RRC message to the first logical CU to cause the first logical CU to report the second identifier and a fourth counting event to the network management system, thereby causing the network management system to determine the second counting object according to the second identifier and to update the count data for the second counting object according to the fourth counting event.

7. The method of claim 5, wherein the RRC setup complete message carries second PLMN information, the second PLMN information belonging to a logical cell with which the UE has set up an RRC connection, and in the case where the second PLMN information does not match the PLMN information of the first logical cell, after said reporting the first identifier and the third counting event to the network management system, the method further comprising:

sending a context release request to the first logical CU to cause the first logical CU to report the second identifier and a fifth counting event to the network management system, thereby causing the network management system to determine the second counting object according to the second identifier and to update the count data for the second counting object according to the fifth counting event; and releasing context information for the setup of an RRC connection of the UE with the first logical CU in response to receiving a context release response fed back from the first logical CU.

8. The method of claim 7, wherein after said releasing context information for the setup of an RRC connection of the UE with the first logical CU, the method further comprises:

determining a second logical cell according to the second PLMN information; and sending a third uplink RRC message carrying a target field to a second logical CU of the second logical cell to cause the second logical CU to report a third identifier and a sixth counting event to the network management system in response to the target field, thereby causing the network management system to determine a third counting object according to the third identifier and to update count data for the third counting object according to the sixth counting event, wherein the target field characterizes previous RRC setup complete of the UE with the second logical CU, and the third identifier belongs to the second logical cell.

9. A base station, comprising:

a memory, a processor, and a computer program stored in the memory and executable by the processor, wherein the processor, when executing the computer program, implements a method for acquiring count data of claim 1.

10. A non-transitory computer-readable storage medium storing computer-executable instructions, wherein the computer-executable instructions are used for executing a method for acquiring count data of claim 1.

11. A method for acquiring count data, applied to a network management system, the network management system being communicatively connected to a physical distributed unit (DU) of a physical cell, the method comprising:

acquiring a first counting event reported by the physical DU, wherein the first counting event is determined by the physical DU according to trigger information for a radio resource control (RRC) connection, the trigger information being from user equipment (UE); and updating count data for the physical cell according to the first counting event.

12. The method of claim 11, wherein said updating count data for the physical cell according to the first counting event comprises:

acquiring a first identifier reported by the physical DU, and determining a first counting object according to the first identifier, wherein the first identifier belongs to the physical cell; and updating count data for the first counting object according to the first counting event.

13. The method of claim 12, wherein the trigger information is an RRC setup request message, and after said updating count data for the first counting object according to the first counting event, the method further comprises:

acquiring the first identifier and a third counting event that are reported by the physical DU in the event of receiving an RRC setup complete message sent from the UE;

determining the first counting object according to the first identifier; and updating the count data for the first counting object according to the third counting event.

14. The method of claim 12, wherein the network management system is communicatively connected to a logical centralized unit (CU), and after said updating count data for the physical cell according to the first counting event, the method further comprises:

acquiring a cell identifier and a cell counting event reported by the logical CU, the cell identifier belonging to a logical cell to which the logical CU belongs;

determining a cell counting object according to the cell identifier; and updating count data for the cell counting object according to the cell counting event.

15. A network management system, comprising:

a memory, a processor, and a computer program stored in the memory and executable by the processor, wherein the processor, when executing the computer program, implements a method for acquiring count data of claim 11.

16. A non-transitory computer-readable storage medium storing computer-executable instructions, wherein the computer-executable instructions are used for executing a method for acquiring count data of claim 11.

* * * * *